J. J. HAMPSON.
PACKING FOR PISTONS.
APPLICATION FILED MAR. 31, 1909.
936,717.
Patented Oct. 12, 1909.
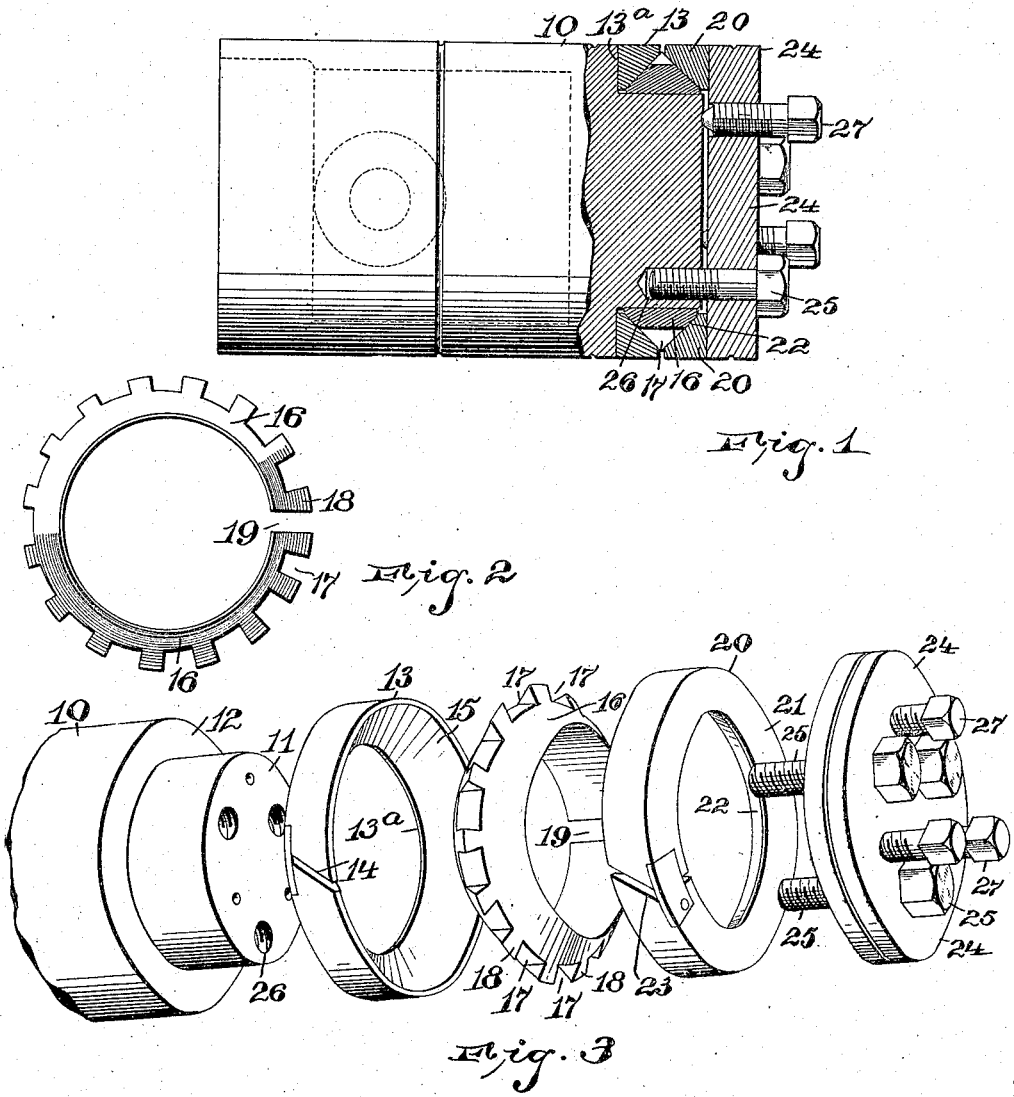

UNITED STATES PATENT OFFICE.

JOHN J. HAMPSON, OF NEWARK, NEW JERSEY.

PACKING FOR PISTONS.

936,717.

Specification of Letters Patent. Patented Oct. 12, 1909.

Application filed March 31, 1909. Serial No. 486,971.

*To all whom it may concern:*

Be it known that I, JOHN J. HAMPSON, a citizen of the United States, residing at Newark, in the county of Essex and State of New Jersey, have invented certain new and useful Improvements in Packing for Pistons; and I do hereby declare the following to be a full, clear, and exact description of the invention, such as will enable others skilled in the art to which it appertains to make and use the same, reference being had to the accompanying drawings, and figures of reference marked thereon, which form a part of this specification.

This invention relates to an improved packing for pistons, and is designed to provide a means for making a tight joint between the piston and the cylinder and not permit the passage of the motive fluid between the piston and the packing, nor between the cylinder and the packing.

The packing is adjustable so that when it becomes worn down it can be easily repaired and made tight by the manual manipulation of an adjusting means. The adjustable means is also provided with a locking means so that it can be held against accidental relaxation.

The invention is illustrated in the accompanying drawing, in which—

Figure 1 is a side view of a piston, but shown in section to illustrate the packing. Fig. 2 is a face view of a ring whose function it is to cause the packing to be expanded. Fig. 3 is a perspective view of the elements of the packing shown separated, but in their successive positions so that they would be in place if they were assembled.

This packing is adapted for the usual form of piston 10 which is provided on its end with a concentric lug 11 which forms a square shoulder 12. A split ring 13, which is preferably split diagonally or obliquely as at 14, is placed against the shoulder 12, the ring having a flat face 13ᵃ to fit against the face of the shoulder 12 and having its inner edge beveled or chamfered as at 15. A V-shaped ring having the two beveled faces 16 is arranged with one of the beveled faces 16 against the beveled face 15 of the ring 13. The last mentioned ring is a spreading ring acting to force the packing ring outward, but is itself made to have a slight spring so that it can give way and be compressed when necessary. The cut-away portions 17 are arranged around the periphery of the spreading ring and form teeth 18 which give the device strength, the cut-away portions being arranged eccentric to the body portion of the ring, as shown in Fig. 2, so that the split portion 19 has sufficient spring to it to allow it to contract when necessary, as will be described hereinafter. A ring 20, which is similar to the ring 13, forms a packing ring having an inner beveled face to fit up against the beveled face 16 of the spreading ring opposite the face engaged by the beveled face 15 of the ring 13.

It will be evident from this construction that when pressure is applied to the flat face 21 of the ring 20, which ring is split as at 23, the pressure on the flat outside faces of these packing rings, forcing their beveled faces on the beveled faces of the spreading ring, will make a tight joint between the packing ring and the cylinder in which the piston is placed. The rings do not fit tightly on the lug 11. A disk 24 bears on the flat face of the ring 20, and screws 25, with their heads projecting from the disk 24, are screwed into the holes 26, in the lug 11, to draw the disk against the packing rings and thus cause them to be spread. When a tight fit is secured the lock screws 27 are screwed down tightly against the face of the lug 11 as shown in Fig. 1, and the whole structure is locked in place and there is no releasing of the packing rings. There is a tight joint between the packing rings and the cylinder in which they are operating, and it will be seen from Fig. 1 that there is also no chance for any of the motive fluid, such as steam or gas, to work down between the packing rings and the piston, which is the case in the usual form of packing, there being more leakage, usually, between the packing ring and the piston, on which it is mounted, than between the packing ring and the cylinder, since the packing rings work loose in the pistons and allow the gas to pass around behind them, instead of between them and the cylinder. When the cylinder becomes heated and a tighter fit is caused between the packing rings and the cylinder, the packing rings can contract slightly because they are split, and they in turn would cause a contraction of the spreading ring by reason of the spreading ring being split also.

It will be evident that slight changes in construction might be made and no departure taken from the present invention, since one packing ring might be used and forced against the spreading ring, as will be understood.

Having thus described my invention, what I claim is:—

1. The combination of a piston having a lug projecting from its end, of a packing ring having a beveled face and encircling the lug, a spreader ring having a beveled face to engage the beveled face of the packing ring and projecting beyond the end of the lug, a disk bearing on the rings to cause their beveled faces to come in contact, and co-acting means on the disk and the lug to subject the disk to an adjustable pressure toward the rings.

2. The combination of a piston having a lug thereon forming a squared shoulder, of a piston ring having a flat back to rest against the shoulder and having its inner face beveled, a spreader ring V-shaped in cross-section having one of its beveled faces against the beveled face of the packing ring, a second packing ring having a beveled face to fit on the spreader ring and having a flat back and projecting beyond the end of the lug, a disk bearing on the flat back of the second spreader ring, and screws passing through the disk and the lug to force the disk and the rings together.

3. The combination of a piston having a lug thereon forming a squared shoulder, of a piston ring having a flat back to rest against the shoulder and having its inner face beveled, a spreader ring V-shaped in cross-section having one of its beveled faces against the beveled face of the packing ring, a second packing ring having a beveled face to fit on the spreader ring and having a flat back and projecting beyond the end of the lug, a disk bearing on the flat back of the second spreader ring, screws passing through the disk and the lug to force the disk and the rings together, and tap screws in the disk and bearing on the face of the lug to lock the disk and its screws in position.

4. The combination of a piston having a lug thereon forming a squared shoulder, a spreader ring V-shaped in cross-section, the spreader ring being split and having cut away portions of a depth varying so that the inner edges of the cut away portions will be eccentric to the inner face of the ring, the deepest cut away portions being adjacent to the split in the spreader ring, beveled packing rings with their end faces flat and having their beveled portions resting on the beveled faces of the spreader ring the outer packing ring extending beyond the end of the lug, a disk to bear on the flat outer face of one of the packing rings, and co-acting means on the disk and the lug to subject the disk to an adjustable pressure toward the rings.

In testimony, that I claim the foregoing, I have hereunto set my hand this 22d day of March 1909.

JOHN J. HAMPSON.

Witnesses:
JAMES H. BROWN,
JAMES ALLISON, Jr.